United States Patent [19]

Freudenberg et al.

[11] Patent Number: 5,020,782
[45] Date of Patent: Jun. 4, 1991

[54] HYDRAULICALLY DAMPED RUBBER BEARING HAVING A FLEXIBLY EXPANDABLE WAVEGUIDE

[75] Inventors: Ulrich Freudenberg, Hirschberg; Tillman Freudenberg, Weinheim, both of Fed. Rep. of Germany

[73] Assignee: Firma Carl Freudenberg, Weinheim/Bergstrasse, Fed. Rep. of Germany

[21] Appl. No.: 422,763

[22] Filed: Oct. 17, 1989

[30] Foreign Application Priority Data

Oct. 18, 1988 [DE] Fed. Rep. of Germany ....... 3835384

[51] Int. Cl.$^5$ ............................................. F16F 9/00
[52] U.S. Cl. .................... 267/140.1; 180/312; 248/562; 248/636
[58] Field of Search ................ 267/140.1 K, 140.1 A, 267/140.1 C, 219; 248/562, 636; 180/312, 300, 902

[56] References Cited

U.S. PATENT DOCUMENTS

| 4,159,091 | 6/1979 | LeSalvar et al. | 267/219 X |
| 4,277,056 | 7/1981 | Ticks | 267/140.1 A |
| 4,739,962 | 4/1988 | Morita et al. | 287/140.1 A X |

FOREIGN PATENT DOCUMENTS

| 235540 | 9/1987 | European Pat. Off. | 267/219 |
| 7616276 | 5/1976 | Fed. Rep. of Germany . | |
| 47541 | 3/1984 | Japan | 267/140.1 |
| 2104619 | 3/1983 | United Kingdom | 267/140.1 |

Primary Examiner—George E. A. Halvosa
Attorney, Agent, or Firm—Kenyon & Kenyon

[57] ABSTRACT

A hydraulic damped rubber bearing includes a damping devices for damping low and high-frequency vibrations. A damping device for low-frequency vibrations utilizes throttle or resonant effects and a damping device for high-frequency vibrations above 10 Hz utilizes a flexibly expandable waveguide, which is closed off at the end distal the working chamber by an element having a reflection-free resistance to flow.

14 Claims, 5 Drawing Sheets

HYDRAULICALLY DAMPED RUBBER BEARING HAVING A FLEXIBLY EXPANDABLE WAVEGUIDE

BACKGROUND OF THE INVENTION

The invention generally relates to a rubber bearings and, more particularly, to an improved hydraulically damped rubber bearing.

German Utility-Model Patent 76 16 276 discloses a rubber bearing having a liquid-filled working chamber in which first means are provided for damping low-frequency vibrations below 20 Hz and second means are provided for damping high-frequency vibrations above 20 Hz. The first means is formed by an elastically expandable bearing spring defining the working chamber and having a first expanding compliance and by a damping opening, through which fluid is displaced to dissipate energy when low-frequency vibrations are introduced. The second means is formed by a conduit, which connects the working chamber with a surge chamber and has a funnel-shaped crosssection in the direction of the working chamber. This conduit is closed off opposite the surge chamber by a damping element having a resistance to flow R. At its narrowest location, the conduit has the characteristic wave impedance Zw.

The first means used to damp low-frequency vibrations thereby comprises a damping opening having a duct-type design. When low-frequency vibrations are introduced, the liquid volume contained in this opening attains a resonant movement to effectively damp the vibrations. When high-frequency vibrations are introduced, the resonant movement of the contained liquid is brought to a standstill and the second means becomes active. The second means comprises an elastically supported membrane, which serves to insulate pressure changes in the working chamber caused by the introduction of the high-frequency vibrations. Because the membrane is flexibly supported, however, the insulation achieved is not very good. In any case, residual forces remain, which are transmitted via the rubber bearing. This becomes clearly evident when low-frequency vibrations are introduced at the same time as the high-frequency vibrations. In these instances, the membrane temporarily makes contact against the inflexible end stops of the rubber bearing. At this point, the membrane is completely ineffective as the high-frequency vibrations are transmitted in an unmitigated state.

SUMMARY OF THE INVENTION

Thus, one of the problems to which the invention is directed is the provision of a rubber bearing of the type mentioned above in such a manner that when low-frequency vibrations are introduced, at the least, an equivalent damping of these vibrations occurs and that the forces transmitted when high-frequency vibrations are introduced are comparatively reduced, particularly, in instances where the high-frequency vibrations are introduced at the same time as the low-frequency vibrations.

This problem is solved, according to the invention, by providing a rubber bearing of the type mentioned in which:

a) the conduit has a length L, which is at least 0.2 times as great as the largest wavelength of the pressure fluctuations produced in the conduit when high-frequency vibrations are introduced;

b) the conduit is elastically expandable within the length L at least at one circumferential location and has a second expanding compliance, which cumulatively supplements the first expanding compliance in such a way that the desired energy dissipation is produced in the damping opening when low-frequency vibrations are introduced; and c) the resistance to flow R conforms, for the most part, with the characteristic wave impedance Zw and the length of the conduit is mostly invariable.

These features are further clarified in the following:

The conduit of the rubber bearing of the invention has a limited flexible compliance in the circumferential direction at least at one location of the inner wall. In this area, its expanding compliance cumulatively supplements the bearing spring defining the working chamber at other locations. When low-frequency vibrations are introduced, the magnitude of the liquid volume displaced back and forth in the damping opening between the working chamber and a compensating chamber thus is determined by both expanding compliances together. In this manner, it is easy to adapt the damping action to special requirements of the particular application. This is especially true when the bearing spring is designed to be very flexible, which has a favorable effect on the suppression of disturbing forces.

When high-frequency vibrations are introduced, this effect is increasingly diminished, as a result of the inertial mass produced by the liquid. The degree of the relative displacement of liquid components observed when low-frequency vibrations are introduced in the damping opening thereby is increasingly diminished when higher frequency vibrations are introduced. In the rubber bearing of the invention, this is replaced more and more by a wave phenomenon, which occurs in the conduit.

The wave phenomenon is started by the pressure changes produced in the working chamber, which spread out in the form of pressure waves through the conduit in the direction of the surge chamber. At higher frequency vibrations in the frequency range between 20 and 100 Hz, the rubber bearing of the invention has a very flexible spring characteristic. This will be clarified subsequently. Above approximately 100 Hz, the dynamic spring rate increases, however, not as a result of the effects of inertia, but rather as the result of a dissipation in the excitation power of a damping element, which is arranged between the conduit and the surge chamber. The effectiveness in the high-frequency range, which is particularly interesting in acoustical respects, therefore still is present even when low-frequency, large amplitude vibrations are introduced into the rubber bearing simultaneously with the high-frequency vibrations. The surge chamber and the compensating chamber thereby can be configured as a single chamber or as separate chambers, without causing any change in the basic function.

The effectiveness of the rubber bearing of the invention is achieved through the application of previously known wave-acoustical effects to rubber bearings. Subject to the very low compressibility of the customary hydraulic liquid (such as, for example, glycol and/or water) contained in the rubber bearing, the wavelengths of acoustic waves produced in this respect are actually much greater than the lengths of known hydraulically damped rubber bearings having liquid-filled working chambers. The inertial mass of the liquid required for this is accorded a flexibility according to the invention, with the help of the expanding compliant design of the inner wall of the conduit. As a result of this flexibility, the wavelengths within the range are stepped down a few centimeters and they are able to be absorbed in a damping element in a reflection-free manner, without necessitating a conduit with unreasonably large dimensions.

To explain this, reference is made to the propagation of pressure or volumetric flow waves in a tube having a flexibly compliant inner wall. Under the influence of a pressure signal, this liquid volume can be stored temporarily in subsections, which are successive in the longitudinal direction, and can be released again. Consequently, it is practical to assign a length-related compliance quantity per unit length, $C'$, to the tube. The size depends on the modulus of elasticity, $E$, of the inner wall material forming the tube, the radii proportion of the inner wall $x$ and the cross-section $A$ of the conduit:

$$C = \frac{2A}{E} \cdot \frac{1 + x^2}{1 - x^2}$$

In the same way, one can define an inertial quantity per unit length, $L'$, which depends on the density $\rho$ of the liquid and on the cross-section of the conduit:

$$L' = \frac{\rho}{A}$$

The propagation rate of the waves $v$ is given by $$v = \frac{1}{\sqrt{L' \times C'}}$$

and with the help of $v$ and the frequency $f$, one obtains the wavelength:

$$\gamma = \frac{v}{f}$$

A further characteristic quantity of the conduit is the wave impedance $Zw$, defined as the quotient of the compression amplitude and the volumetric flow amplitude. The result for $Zw$ is:

$$Zw = \sqrt{\frac{L'}{C'}}$$

The waves are absorbed free from reflections in the conduit of the rubber bearing of the invention as the conduit is closed off at the end distal the working chamber by a damping element, which has a resistance to flow $R$ conforming to the characteristic wave impedance $Zw$. In the technical respect, the damping element can be designed as a purely viscous resistance to flow.

All in all, one obtains an absorber able to convert the pulsating pressure change, which results when high-frequency vibrations of more than 20 Hz are introduced into the working chamber of the rubber bearing, into an undulation in the conduit. The energy transported in the waves is consumed in the damping element.

The described mechanism is activated, when the length of the conduit exceeds $\gamma/4$. This is a frequency condition, since the propagation rate $V$ does not depend on the frequency.

The conduit of the rubber bearing of the invention has a cross-section, which is continuously tapered in a funnel shape toward the damping element. Also, the flexible inner wall of the conduit has a thickness that is continuously diminished. By this means, constancy in the length and propagation rate of the pressure waves over the entire length of the conduit is attained. Of course, a divergent functional principle does not result even when several such conduits are connected in parallel.

As far as wave acoustics are concerned, such a conduit is not yet effective at low frequencies below 10 Hz. Due to the high resistance to flow of the damping element, at these frequencies the liquid is compressed, on the contrary, through the damping opening such that an interaction develops between the liquid in the damping opening and the expanding compliance of the inner wall of the conduit and of the bearing spring. Here, the inner wall of the conduit contributes considerably to the hardening mechanism of the rubber bearing, promoting a suitable damping of low-frequency vibrations. Dependence on the contribution of the bearing spring to the volume compliance of the working chamber is no longer required to eliminate high-frequency vibrations. As a result, there is more constructional freedom to optimally design the bearing spring for its load bearing function.

In the area of acoustic frequencies, it is beneficial to have the lowest possible characteristic wave impedance at the inlet to the conduit. This requirement is met by the funnel-shaped design, since the wave resistance in this case is lowest at the inlet and then rises with increasing length.

The surge chamber closing off the outlet of the conduit may be bounded by a flexible inner wall, which provides for the pressureless absorption of an additional liquid volume. By this means, no backpressure whatsoever is able to build up in the surge chamber and the maximum available pressure drop may be advantageously employed to attain a good damping action.

The damping element arranged between the conduit and the surge chamber may comprise solid bodies immovably held together to guarantee a fixed coupling to the conduit. This is important to guarantee that the conduit is sealed in a reflection-free manner. It is equally possible to use a one-piece, porous member.

If several solid bodies are used, they should be bonded and/or mechanically clamped by a housing that is pervious to liquid. In the former case, it is possible to establish a reciprocal bonding using a glue or by making the surface of the solid bodies sticky and subsequently molding them together. Damping elements prepared in this manner can be produced very cost effectively.

It is also possible to hold the solid bodies, which are loosely packed, in a housing that is pervious to liquid, for example, in a rigid sieve-type cage and then to press them together in the cage to make them immovable. In this case, a comparatively higher manufacturing cost is incurred. However, the distribution of the pore radii achieved has an especially fine and uniform structure, which can be reproduced with excellent results. Therefore, it has proven worthwhile to use such damping elements, particularly for a large-scale production, where it is important to attain optimal uniformity in the products that are obtained.

The inlet of the conduit facing the working chamber should have a cross-section that is at least 0.2 times larger than the cross-section displaced by the bearing spring when vibrations are introduced. If the ratio is any smaller, then, relative to eliminating high-frequency vibrations, the damping action decreases below a technically practical order of magnitude. Therefore, larger ratios are preferred, particularly a ratio of at least 0.6. The cross-section of the inlet of the conduit also may be approximately as large as the cross-section of the bearing spring displaced when vibrations are introduced. In this case, however, a relatively long overall length of the conduit results, which in a functional respect is designed as a waveguide.

With regard to the design of the inner wall in the circumferential direction, it is sufficient in the simplest case, if it is radially expandable at only one location. The technical feasibility is all the more simple, the more expanded this location is. Therefore, within the scope of the present invention and looked at from the technical point of view, a design is preferred in which the conduit is completely enclosed in the circumferential direction by an expandable inner wall. Such a conduit can be bounded on the inside and outside by funnel-shaped surfaces, i.e., by rectified, truncated cone-shaped surfaces, lying concentrically within each other. In this design, the manufacturing procedure is especially simple. If, on the other hand, an optimum effectiveness is desired, which only can be attained by guaranteeing a constant rate of wave propagation throughout the entire length of the conduit, then it is necessary for the funnel-shaped surfaces to be formed as exponential funnels. In this case, the effectiveness attained in the end also can be predetermined in an exact mathematical manner.

It is possible for at least one section of the length of the conduit to have an oval cross-section. With such a design, the conduit responds more flexibly to small-amplitude compressional vibrations of the contained liquid than to larger-amplitude compressional vibrations. This is advantageous relative to the damping of both low-frequency vibrations as well as high-frequency vibrations.

The conduit also may have an inner wall having a membrane-type form in the area of the flexible circumferential locations and a thickness that increases continuously in the direction of the working chamber. With such a design, the membrane-type circumferential location in and of itself can have an even shape, making it possible to give the conduit altogether a very compact shape and to surround it by metallic inner walls at the remaining circumferential locations. In this manner, it is guaranteed at the same time that the flexible circumferential location does not undergo any undesirable elongation in the longitudinal direction, during normal operational use of the rubber bearing.

The conduit also may have an expandable inner wall, which is supported in the longitudinal direction at least at one location by a reinforcement element extending diagonally to the longitudinal direction of the conduit. This element may be embedded in the expandable inner wall. However, it also may comprise a supporting element that abuts the outside of the inner wall and perhaps forms a component of the inner wall and/or of the metallic housing of the rubber bearing.

It is actually insignificant, if only one or several conduits of the preceding type are used in a rubber bearing constructed according to the invention. However, it is important that each individual conduit be operative as a waveguide and in this respect have a certain slenderness. The length, which is the basis of the calculation, thereby results from the section of the length of the conduit that is expandable in the circumferential direction.

Further features, advantages and embodiments of the invention are apparent from consideration of the following detailed description, drawings and appended claims.

DETAILED DESCRIPTION

Figure 1:
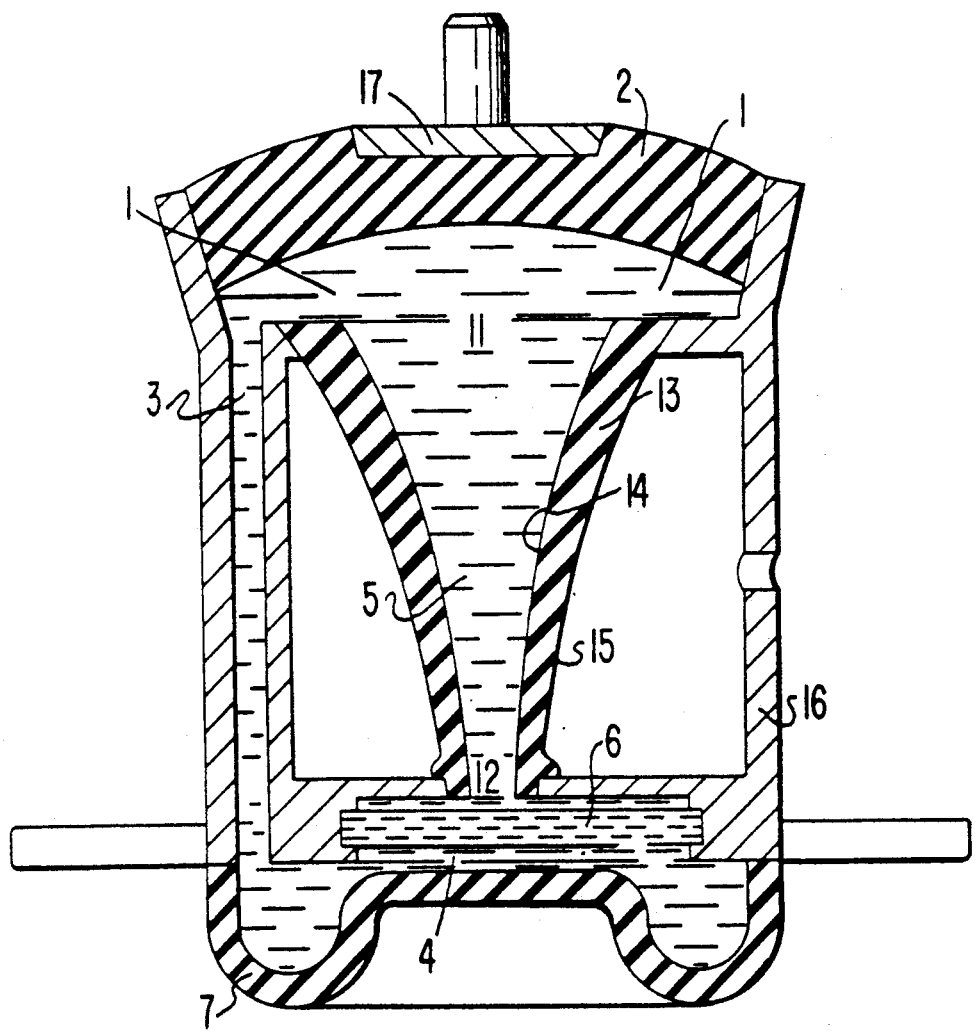
FIG. 1 illustrates a first embodiment of a rubber bearing constructed according to the principles of the invention in longitudinal section.

The rubber bearing shown in FIG. 1 comprises a support 16 and a journal bearing 17, which may be formed from metallic materials. These parts serve to attach the rubber bearing, on the one hand, to a foundation and, on the other hand, to a vibrating body supported on the rubber bearing. Support 16 and journal bearing 17 are connected by a bearing spring 2, which may be made of rubber-elastic material. Together with the support 16, bearing spring 2 surrounds the working chamber 1, which is filled with a liquid, such as a mixture of glycol and water, and is connected via the damping opening 3 with a compensating chamber. The damping opening 3 has a duct-type shape.

In the middle area, the working chamber 1 is connected via the conduit 5 with a surge chamber 4 such that the damping element 6 is arranged in the intermediate zone between the surge chamber 4 and the conduit 5. The damping element 6 comprises PTFE particles, sintered together in the form of a disk, which is anchored in a recess of the support 16.

The expandable conduit 5 has a tube shape and is made of elastomeric material. Its cross-section 11 is narrowed in a funnel shape in the direction of the surge chamber 4 such that the narrowest location 12 is supported directly in front of the surge chamber 4. The inner wall 13 of the conduit 5 has a thickness that diminishes continuously in the direction of the surge chamber 4 such that the inner wall is bounded on the inside and outside by funnel-shaped surfaces 14, 15, which have the shape of exponential funnels. The length L of the conduit is related to the portion of the conduit that is expandable in the radial direction.

The surge chamber 4, which at the same time forms the compensating chamber into which the damping opening 3 leads, is bounded on the outside by a flexible bellows 7. This bellows enables the pressureless absorption of an additional liquid volume from the working chamber 1, whereby no change in pressure occurs in the working chamber, even after the static load is applied, which is to be removed relative to operating conditions. However, pulsating pressure changes occur in the working chamber 1 when the body supported on the rubber bearing is displaced into a relative oscillatory motion or gives rise to such a motion itself.

The conduit 5 of the rubber bearing is designed to be elastically flexible in the circumferential direction and has an expanding compliance, which cumulatively supplements that of the bearing spring 2 bounded by the working chamber 1. When low-frequency vibrations of less than 10 Hz are introduced, both expanding compliances together thereby determine the size of the liquid volume that is displaced back and forth in the damping opening 3 between the working chamber 1 and the compensating chamber. This volume should be as large as possible to attain good damping action, as is desired in the mentioned case. This requirement is met by the illustrated design as the damping opening 3 has a duct-type shape. It is hereby possible to carry out the adjustment to the total existing expanding compliance, in that the contained liquid volume attains a resonant movement in the frequency range in question. This resonant movement has a maximum effect only at one specific point of the frequency range, which is generally sufficient. On the other hand, in applications where a damping action is required to cover the entire range of a broad band, it is possible to design the damping opening like a diaphragm. The maximum values that can be obtained with such a design, however, are not quite as great as those that are obtainable with the above-described design.

When vibrations of an increasing frequency are introduced, the inertial mass produced by the liquid contained in the working chamber 1 causes the previously described effect to be increasingly diminished. Thus, fewer and fewer liquid volumes are displaced back and forth in the damping opening 3. The damping action attained in the damping opening 3 decreases to the same extent. Due to the circumferential flexibility of the conduit 5, this damping action is increasingly replaced by a wave phenomenon, which can be observed in the same conduit.

This wave phenomenon is initiated by the pressure changes occurring in the working chamber, which spread out through the conduit 5 in the direction of the surge chamber 4 in the form of compressional waves. Meanwhile, the damping element 6 is arranged between the conduit 5 and the surge chamber 4. The compressional waves are absorbed in this damping element in a reflection-free manner. Thus, it is impossible to transmit high-frequency vibrations from the journal bearing 17 to the support 16. This is very important and its significance should be stressed with reference to acoustically active vibrations.

Figure 2:
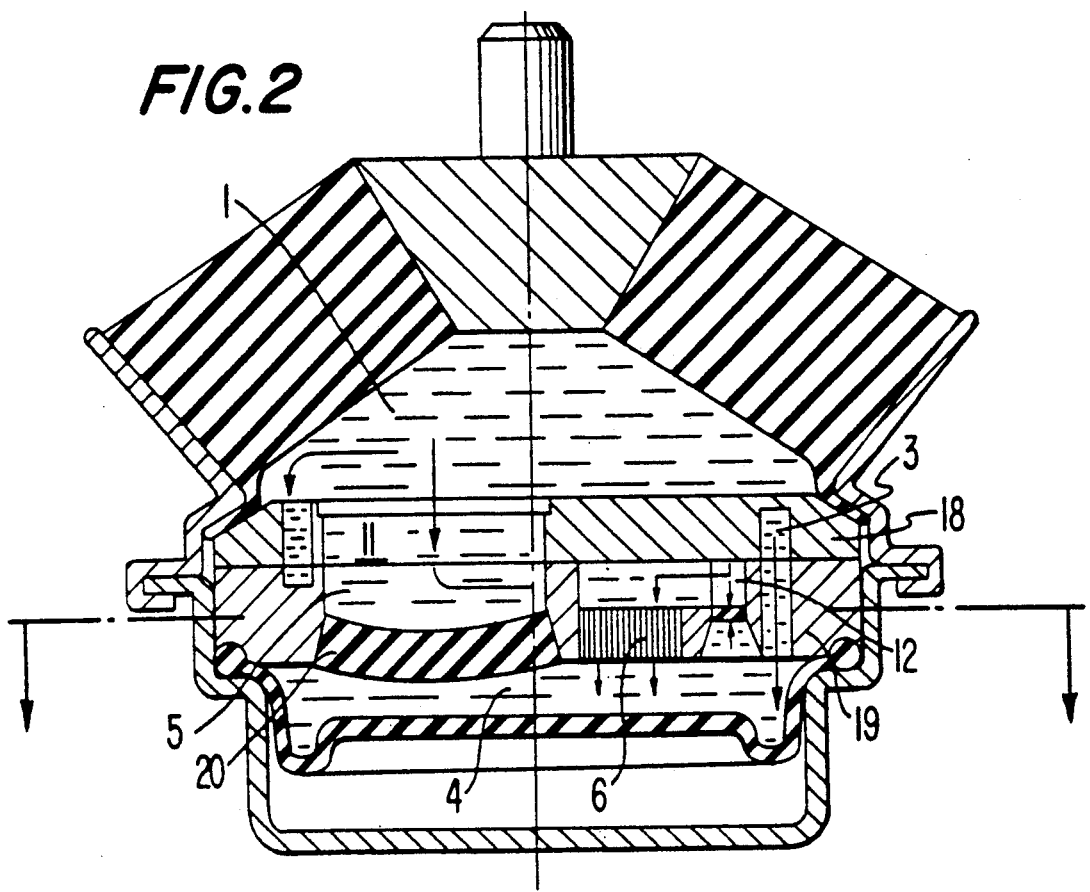
FIGS. 2 and 2a illustrate, in longitudinal and lateral section, respectively, another embodiment of the rubber bearing of the invention.
Figure 2A:
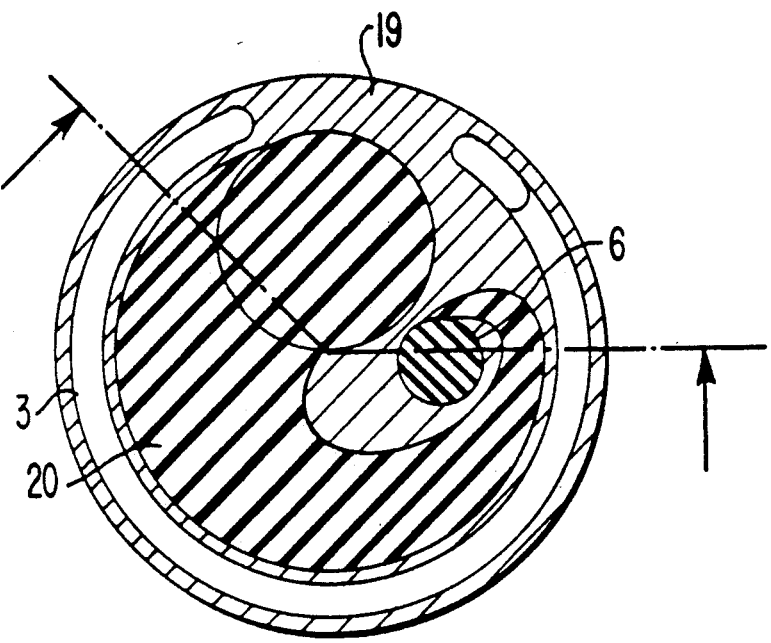

FIGS. 2 and 2a show an embodiment of a rubber bearing of the invention that is functionally similar to the one described above. In this embodiment, however, both the duct-type damping opening 3 and the conduit 5 are arranged in a partition wall, which may be formed from a metallic material and comprises two sections 18, 19. Both sections are pressed together in the axial direction such that the contained cavities complement one another to form the damping opening 3 and the conduit 5. This design provides a more compact construction.

The damping opening 3 and the conduit 5 both have a generally spiral form such that orifices are provided, on one side of the partition wall, in the direction of the working chamber 1 and, on the other side, in the direction of the surge chamber 4. The damping opening 3 thereby is inflexibly surrounded in the circumferential direction over its entire length by both sections 18, 19 of the partition wall, while the conduit 5, on the other hand, is inflexibly surrounded only in the direction of the working chamber 1 and in the direction of both sections of the partition wall. The inner wall that bounds the conduit 5 in the direction of the surge chamber 4 is flexibly constructed and comprises an elastically expandable membrane 20. Parallel to the cross-section of the conduit 5, which diminishes in the direction of the surge chamber 4, this membrane has a thickness D, which also decreases in the direction of the surge chamber. The cross-section at the inlet of the conduit 5 is designated with reference numeral 11 and the cross-section at its narrowest outlet location is designated with the reference numeral 12, in the same way as the above-described example.

The damping element 6 arranged between the outlet of the conduit 5 and the surge chamber 4 comprises a steel band coiled in a spiral, whose windings are spaced slightly apart. The resistance to flow R of the damping element essentially conforms with the characteristic wave impedance Zw at the narrowest location 12 of the conduit 5. In this manner, compressional waves of acoustic activity can be absorbed in a reflection-free manner.

Figure 3:
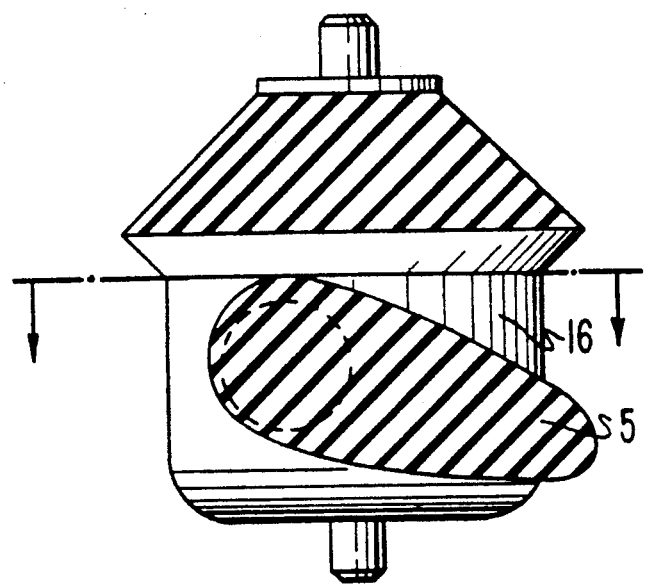
FIGS. 3 and 3a illustrate, in longitudinal and lateral section, respectively, a further embodiment of the invention.
Figure 3A:
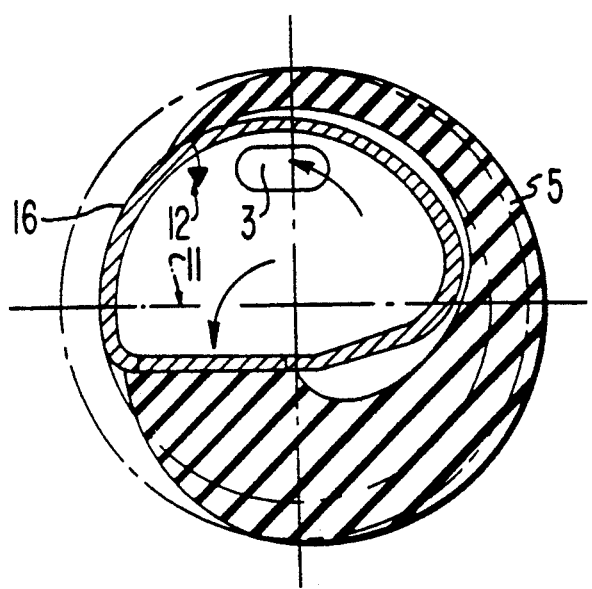

The embodiment shown in FIG. 3 in a front view and in FIG. 3a in a cross-sectional representation is outwardly and functionally similar to the embodiment described above. In this design, however, the conduit 5 is enclosed in the circumferential direction by an inner wall, which is elastically expandable in its entirety and surrounds the outside of metallic support 16 in a spiral manner. The length of the conduit 5 thereby is relatively great. This helps attain the waveguide function, which is of importance to the invention. The remaining details of this embodiment may correspond to the above-described embodiment.

Figure 4:
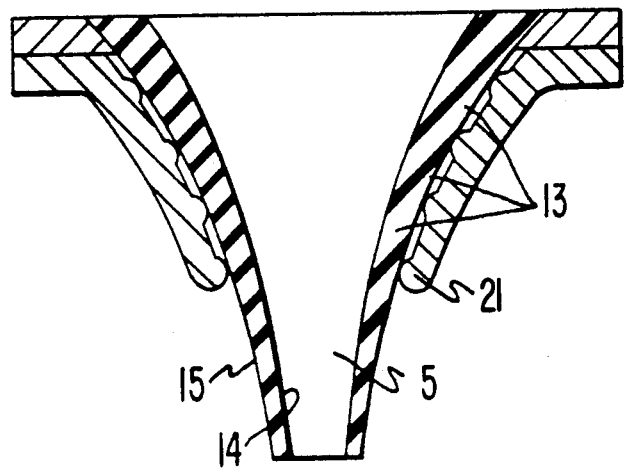
FIG. 4 illustrates a conduit to be used in the rubber bearing of the invention that is supported at several successive locations in the longitudinal direction.

FIG. 4 depicts an embodiment of a conduit 5 that may be used in the rubber bearing of the invention. It is elastically expandable over its entire circumference and is made of an elastomeric material. The conduit is bounded on the inside and outside by exponential funnel-shaped surfaces 14, 15, which are rectified and arranged concentrically to each other. Starting from the inlet cross-section 11, the thickness D of the inner wall is continuously reduced in the direction of the outlet at the narrowest location 12 of the conduit 5. This causes high-frequency pressure changes in the working chamber in the conduit 5 bordering the inlet cross-section to be transformed into compressional waves, which spread out in a linear fashion in the direction of the outlet cross-section 12 of the conduit and, thus, in the direction of the damping element (not shown) arranged at the outlet in which a reflection-free absorption of the waves takes place.

A reinforcement element 21 is provided in the intermediate zone between the inlet cross-section 11 and the outlet cross-section 12. The reinforcement element also is funnel-shaped and has ribs running concentrically around the interior of the reinforcement element. The ribs are spaced apart axially and abut the outer contour of the conduit 5. In this manner, the conduit is able to expand into the spaces between the ribs to easily take up the liquid volumes displaced from the working chamber in a pulsating manner, when high-frequency vibrations are introduced. When low-frequency, large-amplitude vibrations are introduced, the conduit 5 has a relatively stiff and inflexible reaction to the liquid volumes displaced from the working chamber. As a result, these liquid volumes are pressed through the damping opening (not shown) to produce a high-grade damping of such vibrations.

Instead of the above-described reinforcement element 21, which is closed upon itself and secured to the support, a reinforcement element may be used with similar effectiveness that comprises at least one nonexpandable ring, which is secured directly to the outer circumference of the inner wall 13 of the conduit 5 or is embedded in the same. The ring may be metallic and may be formed from a turned piece or a wire closed upon itself.

Figure 5:
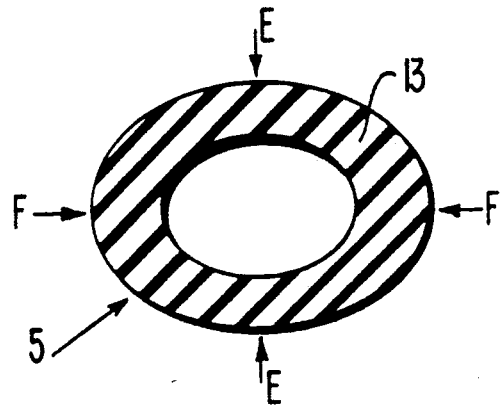
FIGS. 5 and 6 illustrate two embodiments of conduits constructed according to the invention in cross section.
Figure 6:
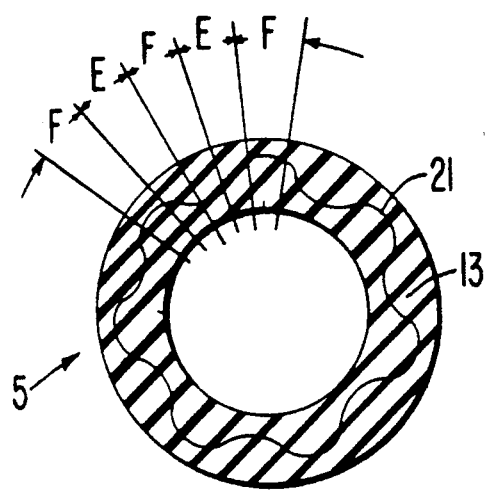

A functionally similar effect can be attained when the conduit 5 is constructed in the manner shown in cross-section in FIGS. 5 and 6. In these embodiments, only a pulsating positioning change of the circumferential components E occurs when there is a high-frequency pressure change in the liquid situated inside the conduit during normal application, whereas the circumferential components F remain in their neutral position. This condition will continue until, in the embodiment of FIG. 5, the inner wall attains a circular cross-sectional shape and, in the embodiment of FIG. 6, until the reinforcement element 21 embedded in the inner wall attains a circular cross-sectional shape. This is the case for vibrations having a frequency of less than 10 Hz and consequently for vibrations, which are insignificant in an acoustical respect and are hereby produced inside the contained liquid. Therefore, pressure changes do not so much cause the conduit 5 to continue to expand, but rather cause the liquid volume displaced from the working chamber 1 to be pressed through the damping opening 3. This opening is connected to a larger damping opening to carry out damping of the corresponding vibrations.

Figure 7:
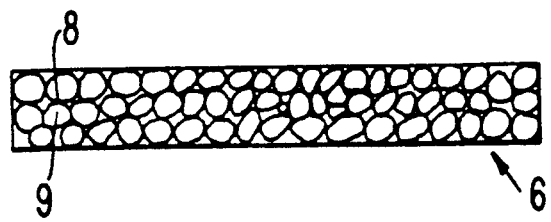
FIGS. 7 and 8 illustrate two embodiments of damping elements of the invention in cross section.
Figure 8:
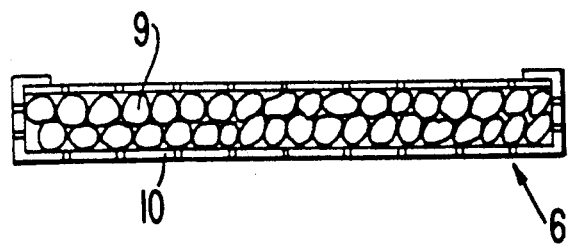

FIGS. 7 and 8 show two exemplary embodiments of damping elements 6. They each have a disk shape, which makes it easier to attach them in the rubber bearing. The embodiment of FIG. 7 is made of PTFE particles 9, which are sintered (bonded) together. The reciprocal bonding zones are shown at 8.

In the embodiment of FIG. 8, metallic particles 9 are enclosed in a sieve-type housing 10, which immovably contain the particles within the housing. Due to the omission of bonding zones, the pore radii are comparatively smaller and can be reproduced with excellent results even in a large-scale production. Relative to the size, the attainable damping effectiveness is especially great.

What is claimed is:

1. A hydraulically damped rubber bearing comprising:
    a liquid-filled working chamber;
    an elastically expandable bearing spring defining the working chamber and having a first expanding compliance;
    a surge chamber;
    a damping opening connected between the working chamber and the surge chamber, and through which liquid from said chambers is displaceable for damping low-frequency vibrations below 20 Hz when such vibrations are introduced into the rubber bearing;
    a conduit connecting the working chamber with the surge chamber;
    a damping element having a resistance to flow R, said damping element closing off said conduit at a point opposite the surge chamber;
    said conduit having a funnel-shaped cross-section widening in the direction towards the working chamber and a length L, which is at least 0.2 times as great as the largest wavelength of pressure fluctuations produced in the conduit when high frequency vibrations above zotlz are introduced, said conduit being elastically expandable within the length L at least at one circumferential location and having a second expanding compliance, which cumulative supplements the first expanding compliance in such a way that the desired energy dissipation is produced in the damping opening when low-frequency vibrations are introduced and wherein said conduit has a wave impedance Zw at its narrowest location, the resistance to flow R essentially conforms to the wave impedance Zw, and the length L of the conduit is substantially invariable; and
    said conduit, said damping element and said surge chamber cooperating to absorb sound waves, produced by the introduction of the high frequency vibrations into the bearing, in a refection-free manner.

2. The rubber bearing of claim 1 further comprising a flexible wall bounding the surge chamber for the pressureless absorption of an additional liquid volume.

3. The rubber bearing of claim 1 wherein the damping element is arranged between the conduit and the surge chamber and comprises solid bodies immovably held together.

4. The rubber bearing of claim 3 wherein the solid bodies are bonded together.

5. The rubber bearing of claim 3 wherein the solid bodies are mechanically clamped together by a housing pervious to liquid.

6. The rubber bearing of claim 1 wherein the conduit has an inlet cross-section facing the working chamber that is at least 0.2 times larger than the cross-section displaced by the bearing spring when vibrations are introduced.

7. The rubber bearing of claim 6 wherein the inlet cross-section is at least 0.6 times larger than the cross-section displaced by the bearing spring when vibrations are introduced.

8. The rubber bearing of claim 7 wherein the inlet cross-section is approximately just as large as the cross-section displaced by the bearing spring when vibrations are introduced.

9. The rubber bearing of claim 1 wherein said circumferential location comprises part of an inner wall of the conduit that is expandable over the entire circumference of the conduit.

10. The rubber bearing of claim 9 wherein the inner wall of the conduit is bounded on the inside and outside by funnel-shaped surfaces.

11. The rubber bearing of claim 10 wherein the funnel-shaped surfaces have the shape of exponential funnels.

12. The rubber bearing of claim 9 wherein said circumferential location has an oval cross-section.

13. The rubber bearing of claim 1 wherein the conduit comprises an inner wall having a membrane-type form in the area of said circumferential location and a thickness that increases continuously in the direction toward the working chamber.

14. The rubber bearing of claim 1 wherein the conduit comprises an inner wall supported in the longitudinal direction at least at one location by a reinforcement element extending diagonally to the longitudinal axis of the conduit.

* * * * *